F. R. WHITE.
BUTTON ATTACHING MACHINE.
APPLICATION FILED DEC. 13, 1907.

908,178.

Patented Dec. 29, 1908.

4 SHEETS—SHEET 2.

WITNESSES

INVENTOR

ATTORNEY

F. R. WHITE.
BUTTON ATTACHING MACHINE.
APPLICATION FILED DEC. 13, 1907.
908,178.
Patented Dec. 29, 1908.
4 SHEETS—SHEET 3.
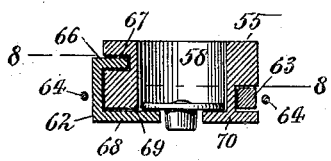
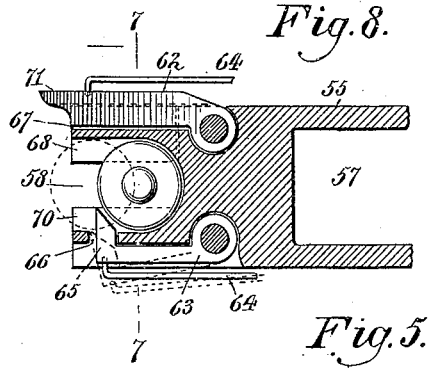
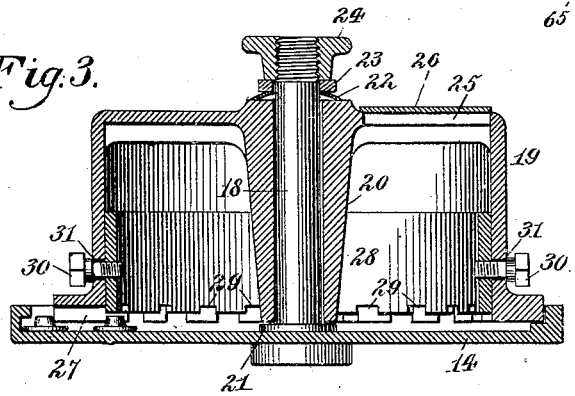
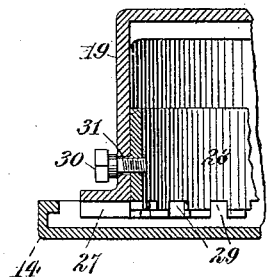
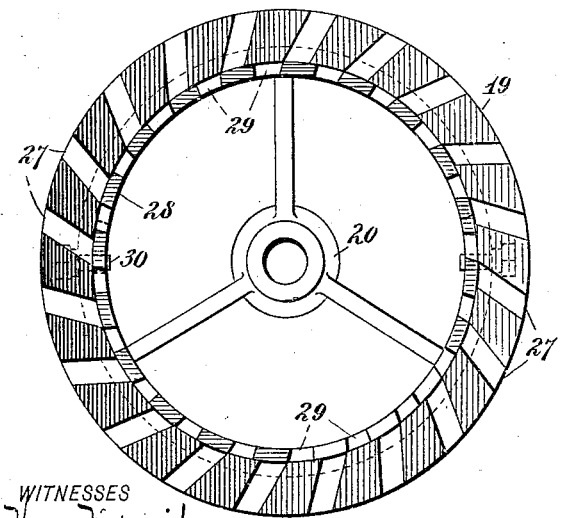
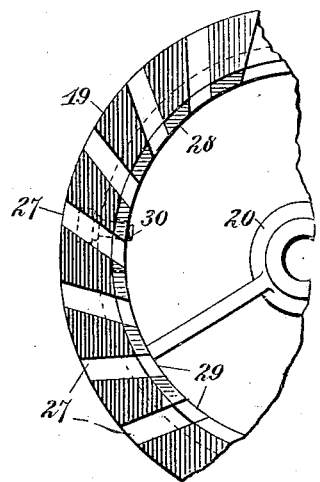

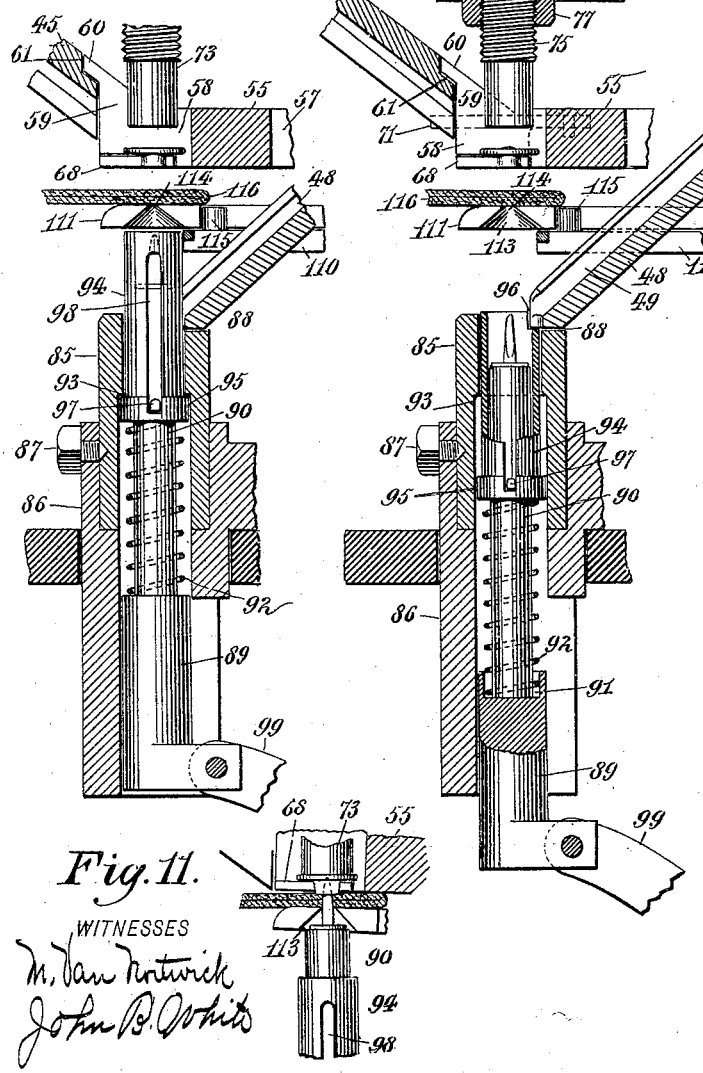

UNITED STATES PATENT OFFICE.

FRANKLIN R. WHITE, OF WATERBURY, CONNECTICUT, ASSIGNOR TO THE PATENT BUTTON COMPANY, OF WATERBURY, CONNECTICUT, A CORPORATION OF CONNECTICUT.

BUTTON-ATTACHING MACHINE.

No. 908,178.     Specification of Letters Patent.     Patented Dec. 29, 1908.

Application filed December 13, 1907. Serial No. 406,271.

*To all whom it may concern:*

Be it known that I, FRANKLIN R. WHITE, a citizen of the United States, and a resident of Waterbury, in the county of New Haven and State of Connecticut, have made and invented certain new and useful Improvements in Button-Attaching Machines, of which the following is a specification.

My invention relates to an improvement in button attaching machines, and more particularly to that class of machines wherein buttons and rivets therefor are successively fed from separate cups to a riveting mechanism, whereby the rivet is driven through the cloth or other material, and into the shank of the button, in which it is upset or headed, whereby the button is securely attached to the fabric.

The object of my invention is to provide a button cup adapted to be employed in connection with buttons having either high or low hubs, and having adjustable means for preventing the low hub buttons from passing out of the cup edgewise.

Another object of my invention is to provide means for securing the cup to the cup-receiver, which, in case a button becomes caught or jammed therein, will prevent the button from being spoiled, and at the same time prevent the machine or any part thereof, from being injured.

A further object of my invention is to provide a heading pin holder, which may be easily and quickly adjusted to suit various styles of buttons, and in which a heading pin is removably supported.

A further object of my invention is to provide a number of heading pins, the lower or "heading" ends of which are differently formed, for use with various styles of buttons, which pins may be quickly and easily placed in or removed from the heading pin holder.

Further objects of my invention are to provide a button receiver and a rivet receiver of peculiar construction, which are adapted to hold the button and rivet securely in position during the operation of the machine.

With these and other objects in view, my invention consists in certain novel features of construction and combinations of parts, as will be hereinafter fully described and pointed out in the claims.

Figure 1:
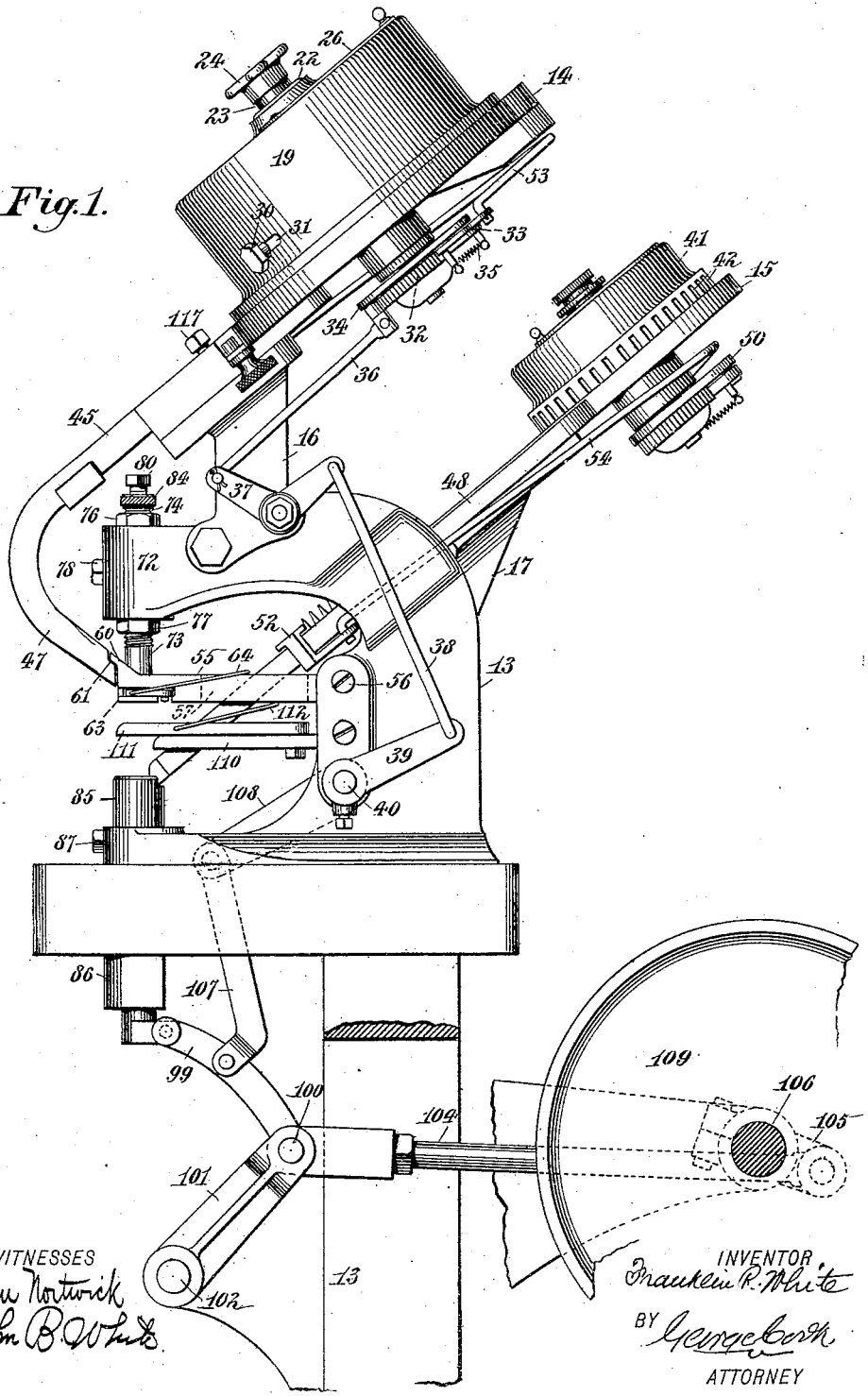
Figure 2:
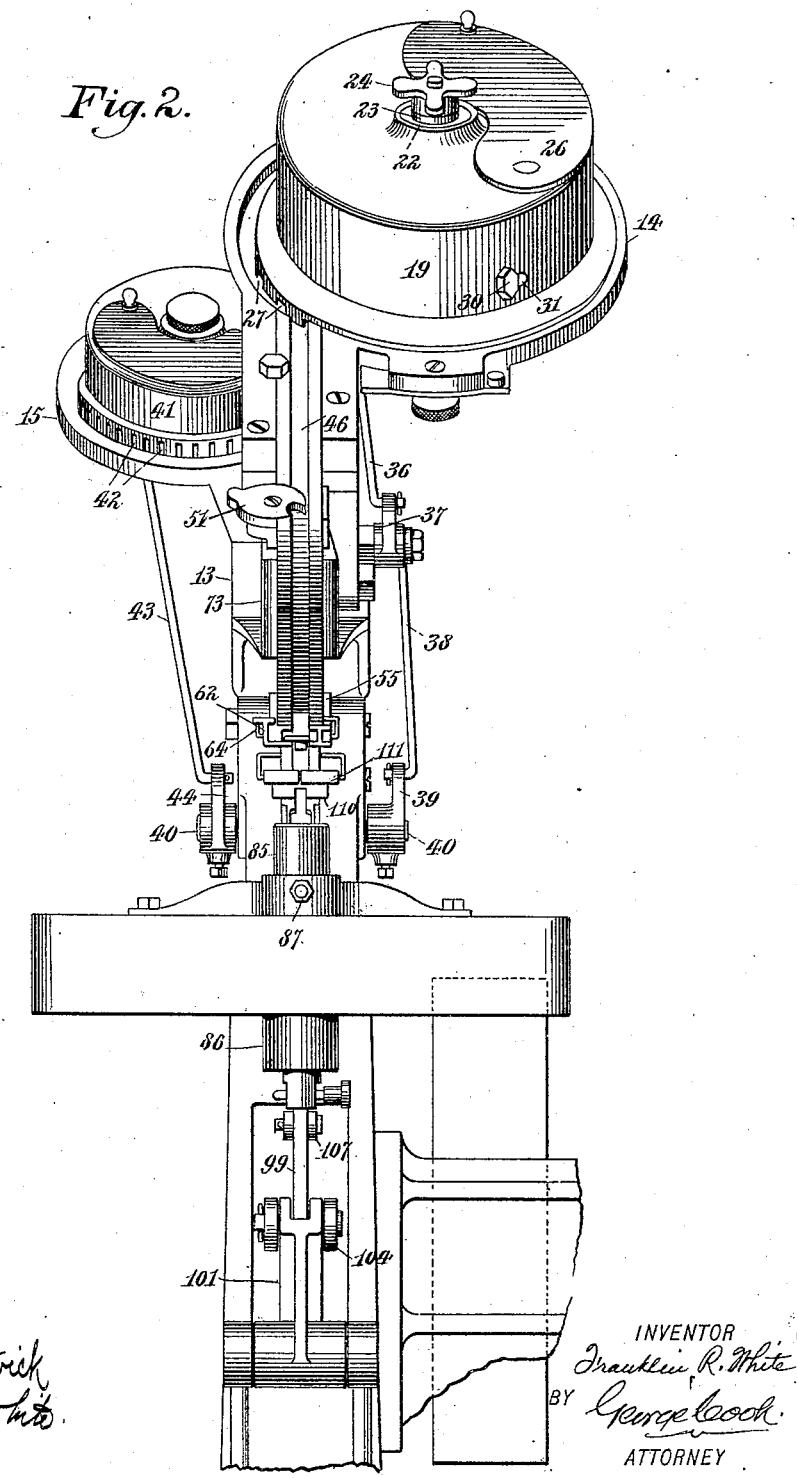

In the accompanying drawings, Figure 1 is a side elevation of my improved machine. Fig. 2 is a front elevation thereof. Fig. 3 is a longitudinal section of the button cup, showing the ring adjusted for use with low hub buttons. Fig. 4 is a bottom plan view of the button cup and ring as shown in Fig. 3. Figs. 5 and 6 are views similar to Figs. 3 and 4, showing the ring adjusted for use with high hub buttons. Fig. 7 is a vertical sectional view of the button receiver taken on the line 7—7 of Fig. 8. Fig. 8 is a sectional view taken on the line 8—8 of Fig. 7. Figs. 9, 10, 11 and 12 are detail views, partly in section, showing the heading pin, and its holder, and the rivet receiver, and illustrating various steps in the operation of the machine. Figs. $12^a$ and $12^b$ are detail views of other forms of heading pins, adapted to be used with other styles of buttons.

Referring to the drawings, 13 represents a suitable frame or standard for supporting the various parts of the machine, to the upper portion of which the flanged button cup holder 14, and the flanged rivet cup holder 15 are secured in any suitable manner, as by arms or brackets 16 and 17, respectively, said cup holders being arranged in an inclined position and substantially parallel with one another, as clearly shown in Fig. 1, the cup holder 14 being preferably above the cup holder 15.

Rotatably mounted upon the button cup-holder 14, is a stud 18, which supports the button cup 19, the latter being provided with a central sleeve 20 adapted to receive said stud, and the lower edge of the sleeeve bears against an annular shoulder 21, formed on the stud, and is held in frictional engagement therewith by means of a hollow spring washer 22, which bears against the upper surface of the cup 19, a solid washer 23, and a nut 24, said members engaging with the outer or upper end of the stud as clearly shown in Fig. 3. By screwing or unscrewing the nut 24, the degree of friction with which the cup 19 engages the stud 18, may be varied, owing to the resiliency of the spring washer 22, and in practice, only just enough friction should be applied to carry the cup, so that if a button gets caught, it would not be damaged or spoiled, the stud, in such an instance, turning independently of the cup. The cup is provided with an opening 25 in its upper surface, through which the buttons are introduced into the interior thereof, said opening being normally closed by a suitable cover 26, and the lower edge or flange of the cup is provided with the usual recesses or openings 27, adapted to permit the buttons to pass out of the cup in the well known manner, as indicated in Fig. 3.

Fitting snugly within the cup 19, is an adjustable ring 28, the lower edge of which is spaced a suitable distance above the lower edge of the cup, and is provided with notches or recesses 29, the width of which recesses equal the width of the recesses 27, said ring being held in place by means of cap or lock screws 30 threaded therein, which pass through elongated slots 31 formed in the side wall of the cup 19, as clearly shown in Figs. 1 and 3, from which it will be understood that by slightly loosening the cap screws, the ring may be revolved or turned a distance equal to the length of the slots 31. When buttons with low hubs are to be used, the ring 28 is rotated into the position indicated in Figs. 3 and 4, the recesses 29 therein, being thrown out of register with the recesses 27 formed in the flange of the cup 19, whereby the portions of the ring lying between the recesses 29 will partially close the recesses 27, as shown, thereby preventing the buttons from passing through said recesses in an edgewise position, but when buttons with high hubs are to be used, the ring 28 is revolved into the position indicated in Figs. 5 and 6, the recesses 29 and 27 registering with one another, as clearly shown, the recesses 27 in this instance being unobstructed.

The stud 18, with which the cup 19 is in frictional engagement, is intermittently rotated by means of the usual pawl and ratchet mechanism, the ratchet 32 being rigidly secured to the lower end of said stud, and the pawl 33 being pivotally mounted upon a plate 34 loosely mounted upon the stud and adapted to oscillate thereon, said pawl being held against the ratchet by a suitable spring 35. Motion is imparted to the plate 34 by means of a rod 36, one end of which is secured to said plate and having its other end secured to one end of a pivoted lever 37, the other end of which is connected by a rod 38 to the arm 39 rigidly secured to the rocking shaft 40, which is operated by means hereinafter described.

A rivet cup 41 provided with the usual recesses 42 in its lower edge or flange, whereby the rivets may pass out of the cup in the usual manner, is rotatably mounted upon the rivet cupholder 15, and is intermittently rotated by means similar to those above described in connection with the button cup and button cupholder, the oscillating plate 50 which carries the pawl, being operated by means of a rod 43, one end of which is secured thereto, and having its other end connected to the arm 44, which is rigidly secured to the above mentioned rocking shaft 40, as shown in Fig. 2.

Communicating with the button cupholder 14, and leading therefrom in a forwardly inclined direction, is a button chute 45, removably supported on the bracket 16 by a screw 117, and provided with an inverted T-shaped groove 46, adapted to receive the button in the usual manner as indicated in Fig. 2, the forward end of said chute being bent or curved inward and downward as indicated at 47, whereby the buttons will be delivered to the button receiver, hereinafter described, right side uppermost, as shown in Figs. 7 and 8.

Communicating with the rivet cupholder 15, and leading therefrom in a forwardly inclined direction, is a rivet chute 48, provided with an inverted T-shaped groove 49, adapted to receive the rivets in the usual manner, and deliver them to the rivet receiver hereinafter described. Located at points intermediate the length of the chutes, are a suitable button escapement 51 and a suitable rivet escapement 52, said escapements being operated by the oscillating plates 34 and 50, to which they are connected by means of rods 53 and 54 respectively, said escapements being adapted to allow one button and one rivet to pass into the lower portion of their respective chutes at each operation of the machine, in the manner well understood in the art.

The various parts above described are so connected and adjusted that, upon a complete to and fro movement of the rocking shaft 40, the button cup 19 and the rivet cup 41 will each be rotated a certain amount by their pawl and ratchet mechanism, whereby one or more buttons and rivets will be permitted to escape from said cups into the upper portion of their communicating chutes, and at the same time the button escapement 51 and the rivet escapement 52 will be operated to feed one button and one rivet respectively into the lower portion of their corresponding chutes, along which they will move by gravity to their respective receivers.

The button receiver comprises an arm 55 the inner end of which is pivoted to the frame 13 at a suitable point 56, whereby it may oscillate in a vertical plane about said point as a center, the central portion of said arm being provided with an opening 57 through which the rivet chute 48 passes, as indicated in Fig. 1, and the outer end of said arm being provided with an inwardly extending recess 58, the inner wall of which is curved to conform to the curvature of a button as clearly shown in Fig. 8, and the side walls of which terminate adjacent the ends of the button chute 45, and are provided with upwardly inclined portions 59 terminating in lugs 60, which are adapted to co-act with corresponding recesses 61 formed in the end of said button chute to hold the arm 55 in its normal substantially horizontal position as indicated in Figs. 1, 9 and 10.

Horizontally pivoted within recesses formed in the outer end of the arm 55, are the jaws 62 and 63, which are held in their normal or innermost positions by means of a suitable spring 64, as shown in full lines in Fig. 8. The jaw 63 which lies within the recess formed in the side of the arm, is provided with an inwardly extending beveled end 65, projecting through an opening 66 formed near the end of said arm, said beveled end being so spaced with respect to the inner curved wall of the recess 58, that, when said jaw 63 is in its normal position, a button may be received within said recess, the beveled end of the jaw preventing it from being accidentally removed, as clearly indicated in full lines in Fig. 8. After the button has been secured to the cloth or other material, as hereinafter described, it may be withdrawn from its position by an outward pull which will cause the button to press against the beveled end 65, thereby forcing the jaw 63 to move outwardly into the position indicated by dotted lines in Fig. 8, to permit the button to pass, and after the button has been withdrawn, the spring 64 will cause the jaw 63 to move back into its normal position, in readiness for the next button which is fed to the receiver. The jaw 62 is provided with an upper inwardly extending flange 66 adapted to ride within a recess 67 formed in the end of the arm 55, and the lower inwardly extending flange 68, which is wider than the flange 66, and which passes through a notch or cut-away portion 69 formed in the lower side of the end of the arm and extends within the recess 58 as shown in Figs. 7 and 8. When the button is in position within the recess, one side thereof will rest upon the inwardly extending flange 68 and the other side will rest upon a flange 70, which extends from the lower edge of, and is preferably integral with the opposite side wall of the recess, as clearly shown in said figures. At its extreme outer end, the jaw 62 is provided with a projection or finger 71, by which the jaw may be moved outwardly to permit the button to drop out of the receiver if it is desired to remove the button before it is attached to the cloth or other material.

Supported within a suitable socket in the forward part of the arm 72 of the frame 13, and located above the button receiver, is a hollow cylindrical heading pin holder 73, provided with upper and lower exteriorly threaded portions 74 and 75 adapted to receive the nuts 76 and 77, by means of which the holder may be adjusted relatively to the button receiver and firmly held within its supporting socket, a set screw 78 extending through a threaded hole in the frame, and having its inner end engaging a vertical recess 79 formed in the surface of the holder, preventing it from turning while being adjusted. At its upper end, the holder is provided with an interior thread adapted to receive the screw 80, the lower end of which is provided with a dove-tailed recess 81, in which the undercut head portion 82 of the heading pin 83 is adapted to fit snugly, as shown in Fig. 12, said heading pin extending downwardly through the opening or bore of said holder. By means of this screw 80, the heading pin may be adjusted within the holder, after which it is locked in position by means of the nut 84. In order that the machine may be used with various types of buttons, I employ a number of heading pins, the lower or heading ends of which are differently formed. In Fig. 12, I show a heading pin, the lower end of which is slightly concave, being adapted to be used with a button having a slightly convex central portion; in Fig. 12$^a$ the pin has a flat lower surface, and is adapted to be used with a flat button, while in the form shown in Fig. 12$^b$, the lower end of the pin has a comparatively deep concave recess formed therein, and is adapted to be used with a button having a comparatively high concave central portion.

While I have shown but three forms of heading pins, it will be understood of course that I may make any number of the same to correspond to various styles of buttons. When it is desired to change the heading pin, the button chute is first removed by withdrawing the screw 117, then the nut 84 is loosened, after which the screw 80 carrying the heading pin, is withdrawn; the heading pin is then removed by sliding it sidewise from the groove 81, the new pin is inserted in position, and the parts are then replaced in their proper positions by reversing the above steps. In each instance, the heading pin is so adjusted in the holder that it will take the pressure due to the riveting, while the holder will prevent the button from rocking.

The rivet receiver, which is supported by the frame 13, at a point below and in line with the heading pin holder, comprises a sleeve 85, having an inner annular shoulder 93, secured in a recess in the upper portion of a socket 86 formed in the frame, in which it is retained by means of the screw 87, and has a cut-away portion or notch 88 formed in its upper edge adapted to receive the lower end of the rivet chute 48, as shown in Fig. 9. Located within the socket and sleeve, and adapted to move vertically therein, is a plunger 89, having a reduced upper portion 90, around the base of which is an annular recess 91, adapted to receive one end of a coiled spring 92, said spring being coiled around said reduced portion and having its other end bearing against the lower end of a sleeve 94, which is movably mounted upon the upper end of the plunger 89 and normally extends beyond the upper end thereof, whereby to retain the rivet in place thereon, as shown in said figure. At the lower end the movable sleeve 94, is provided with an annular shoulder 95, which is adapted to engage with the shoulder 93 in the fixed sleeve 85, during the operation of the machine, whereby the upward movement of the movable sleeve will be limited. Said movable sleeve has a cut-away portion or notch 96 formed in its upper end, which when the sleeve is in its normal or lower position, registers with the notch 88 formed in the fixed sleeve, as clearly shown. A pin 97 secured to the reduced portion 90 of a plunger 89 engages with elongated vertical slots 98, formed in the movable sleeve 94, said pin engaging with the lower ends of said slots when the parts are in their normal or lower position, as shown in Fig. 9, in which position, the upper end of the plunger 89 lies below the upper edge of the movable sleeve and also below the lower end of the rivet chute 48, whereby it may receive and support the rivets which are fed to the rivet receiver by means of said chute. As the plunger is moved upward, as hereinafter described, the movable sleeve 94 will be carried upward therewith due to the action of the spring 92, until its shoulder 95 contacts with the shoulder 93 in the fixed sleeve 85, after which the movable sleeve will remain stationary, the plunger alone continuing its vertical movement, which it is permitted to do by reason of the pin 97 traveling upward within the vertical slot 94, as indicated in Fig. 12, the spring 92 being compressed as shown. As the plunger moves downward, the movable sleeve will be retained in its upper position owing to the action of the spring, until the pin engages the lower end of the vertical slots, after which the continued downward movement of the plunger will carry the sleeve with it until the parts assume their normal positions. Movement is imparted to the plunger 89 by means of a link 99, having one end connected to the lower end of the plunger, and its other end pivotally connected to a pin 100, to which one end of an oscillating arm 101 is also pivoted, the other end of said arm being rotatably mounted upon the pin or shaft 102, secured to the frame 13 at a suitable point. A connecting rod 104 has one end connected to the pin 100, and its other end connected to a crank 105, which is rigidly secured to the shaft 106. A link 107 has one end connected to the link 99, and its other end connected to an arm 108, which is rigidly secured to the rocking shaft 40. The parts are so adjusted and connected that as the connecting rod 104 makes one complete reciprocating or to and fro movement, the plunger 89 will be caused to make a complete up and down movement, and simultaneously therewith, the pawl and ratchet mechanisms and the button and rivet escapements will be operated in the manner above described.

Motion may be imparted to the shaft 106 to cause it to make one complete revolution at each operation in any suitable manner, as for example, by a constantly rotating pulley 109 loosely mounted thereon, which may be caused to rotate the shaft through the agency of a suitable clutch (not shown), which clutch may be thrown into engagement with the pulley by any suitable means, as for example, by a foot pedal, (not shown). As the means of rotating the shaft 106 forms no part of my invention, I have not deemed it necessary to further illustrate the same, as any suitable mechanism may be employed.

Pivoted to the frame just below the button receiver, is a forwardly extending horizontal arm 110, to the upper side of which a pair of jaws 111 are pivoted to move outwardly in a horizontal plane, said jaws being normally held together by means of a suitable spring 112. The outer ends of the jaws extend over the rivet receiver, and each is provided on its under side with a countersunk recess 113 which communicates with a semi-circular recess 114 formed in the upper surface of the jaw and at its inner side, as indicated in Fig. 9. Stops 115 secured to the arm 110, limit the inward movement of said jaws. The arm and jaws are provided with suitable openings to permit the passage therethrough of the rivet chute 48, as is clearly indicated in Figs. 9 and 10.

The operation of the machine will now be described, it being of course understood that the heading pin corresponding to the particular style of button to be used, has been placed in position in its holder as above described. The button cup 19 and rivet cup 41 are partially filled with buttons and rivets, respectively, and are then turned by hand until a few of the buttons and rivets pass out of their cups into the chutes with which they are in communication. The machine is then operated as above described, the various parts making one complete movement, as a result of which one button will be fed right side up into the button receiver, as shown in Figs. 2, 7 and 8, and one rivet will be fed point up, into the rivet receiver, as shown in Fig. 9. The cloth or other material 116, to which the button is to be secured, is now placed upon the upper surface of the jaws 111, as shown in said figure, and the machine is again caused to make a complete operation. As the plunger upon the upper end of which the rivet rests, moves upward, the movable sleeve will travel with it, as above described, thereby preventing any displacement of the rivet, the parts assuming the positions shown in Fig. 10, in which position the movable sleeve has reached the limit of its upward movement with its upper edge just below the lower surface of the outer ends of the jaws 111. Further movement of the plunger forces the rivet to pass through the opening formed by the countersunk recesses 113, and the semicircular recesses 114, by which its movement is guided, through the cloth or other material 116, and into the opening in the shank of the button, as indicated in Fig. 11, the outer ends of the arms 55 and 110 being raised slightly as shown, whereby the upper surface of the button is moved upward to contact with the heading pin and its holder. As the plunger continues its upward movement, it will pass between the jaws 111, which will be forced to separate by reason of the end of the plunger engaging with the countersunk recesses 113, said jaws and their supporting arms dropping down into their normal positions as shown in Fig. 12, and the end of the rivet will be upset or headed within the button as shown, whereby the button will be firmly secured to the cloth or other material. During the upsetting process, the heading pin will take the pressure exerted by the plunger upon the rivet, and the lower end of the heading pin holder will prevent the button from rocking, whereby it is retained in proper position, as clearly shown in Fig. 12. As the plunger returns to its normal position, the cloth is given a slight outward pull, whereby the button attached thereto is withdrawn from the button receiver as above described. As these parts are returned to their normal positions, the escapements 51 and 52, which have been simultaneously operated as described above, will allow another button and another rivet to pass into the lower ends of the chutes, which button and rivet will move down the chutes by gravity and into their respective receivers in readiness for the next operation of the machine.

Having fully described my invention, what I claim as new and desire to secure by Letters Patent, is:—

1. In a machine of the character described, the combination of a button cup having recesses formed in its lower edge, a ring fitting within the cup having its lower edge spaced above the lower edge of the cup, and provided with recesses, which substantially register with the recesses in the edge of the cup, and means for securing the ring in place, and permitting it to be axially turned relative to the cup to throw its recesses out of register with those in the cup whereby portions of the ring between the recesses thereof will close the recesses in the cup.

2. In a machine of the character described, the combination of a button cup having recesses formed in its lower edge, a ring fitting the cup having its lower edge spaced from the corresponding edge of said cup, and provided with recesses adapted to register with those in the cup, said cup having elongated slots in its side wall, and locking screws passing through said slots and holding the ring in place, said screws permitting the ring to be axially turned to carry its recesses out of register with those in the cup whereby portions of the edge of the ring between adjacent recesses serve to close the recesses in the cup.

3. In a machine of the character described, the combination of a button cup having recesses formed in its lower edge, a ring within the cup closely fitting the same and having recesses in its lower edge, connections between the ring, and the cup for axially mounting the latter so that it may be turned to bring its recesses into and out of register with the corresponding recesses in the cup, the recesses in the cup and ring being of substantially equal width and the portion of the lower edge of the ring between adjacent recesses serving to close the recesses in the lower edge of the cup when the ring is turned in one direction, said connection including elongated slots formed in one of the parts and locking screws engaging said recesses to hold the ring in its adjusted position.

4. In a machine of the character described, the combination with a suitable support, of a heading pin holder supported thereby and provided with an opening therethrough, a heading pin supported within said opening, and an adjusting screw fitting the opening in the heading pin holder, the lower end of said screw and the upper end of the heading pin having interengaging means for detachably connecting the heading pin with said screw, substantially as described.

5. In a machine of the character described, the combination with a suitable support, of a heading pin holder and means whereby it is adjustably supported thereby and provided with an opening therethrough, a heading pin supported within said opening, an adjusting screw operable in the upper end of the heading pin holder, and a detachable connection between the lower end of said screw and the upper end of the heading pin, substantially as described.

6. In a machine of the character described, the combination with a suitable support, of a heading pin holder supported thereby and provided with an opening therethrough, a vertically adjustable member supported by said holder, and a heading pin located within said opening and having its upper end detachably secured to said member, substantially as described.

7. In a machine of the character described, the combination with a suitable support, of a heading pin holder supported thereby and provided with an opening therethrough, an adjustable screw engaging therewith and having a groove in its inner end, and a heading pin located within said opening and provided with a head engaging said groove, whereby said pin is removably supported by said nut, substantially as described.

8. In a machine of the character described, the combination with a suitable frame having a socket therein, of a plunger located within said socket and adapted to reciprocate therein, said plunger having a reduced upper portion, a sleeve surrounding said upper portion and movably secured thereto, an annular shoulder formed around the lower end of said sleeve, and a spring surrounding the plunger and bearing upwardly under said shoulder for normally holding said sleeve with its upper end extending beyond the upper end of the plunger, whereby to provide a rivet retaining space, substantially as described.

9. In a machine of the character described, the combination with a suitable frame having a socket therein, and a sleeve fixed to said socket, having an interior shoulder, of a plunger located within said fixed sleeve and adapted to reciprocate therein, said plunger having a reduced upper end, a movable sleeve surrounding said reduced portion and provided with an elongated slot, said movable sleeve having a shoulder on its lower end adapted to engage the internal shoulder on the fixed sleeve, a pin secured to said plunger and engaging with said slot, whereby said plunger may move independently of said sleeve, and a spring for normally holding said movable sleeve with its upper end extending beyond the upper end of the plunger, substantially as described.

10. In a machine of the character described, a button receiver comprising an arm having an inwardly extending recess said arm having an inwardly extending bottom flange or button support, and a spring-pressed jaw at one side of the recess having an extending flange projecting below a portion of said recess and co-acting with the flange of the arm to support a button, said jaw being movably mounted whereby the button may be released.

11. In a machine of the character described, a button receiver comprising an arm having a button recess and having a second recess formed in one of its outer sides, said arm having the opposite side of its lower portion provided with a flange which extends inwardly under the button recess, and a spring-pressed jaw having a top flange to engage the recess in the outer side of said arm and having a bottom flange which extends inwardly beneath the button recess of the arm and co-acts with the bottom flange of the arm to form a button support.

Signed at Waterbury, in the county of New Haven, and State of Connecticut, this 10th day of December, A. D. 1907.

FRANKLIN R. WHITE.

Witnesses:
KATHARINE A. RUBEY,
LEWIS J. HART.